Sept. 3, 1935.   S. M. JONSSON   2,013,273
GREASE GUN
Original Filed Nov. 30, 1931
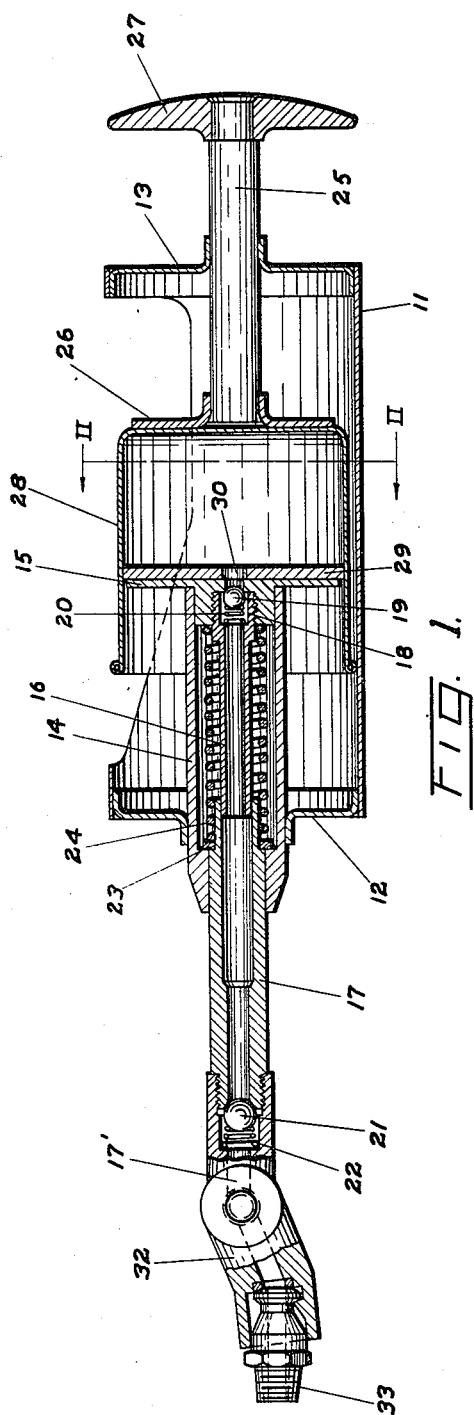
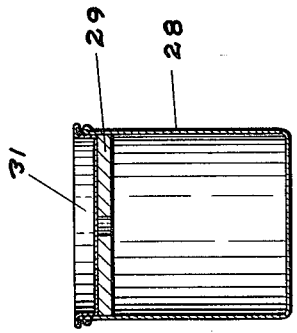
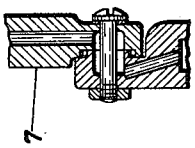
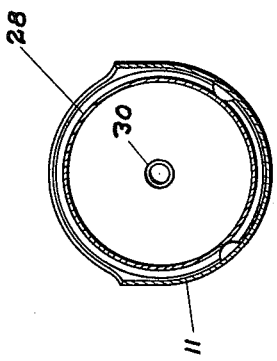
INVENTOR.
SVEN M. JONSSON
BY
John A. Watson
ATTORNEY.

Patented Sept. 3, 1935

2,013,273

UNITED STATES PATENT OFFICE 2,013,273

GREASE GUN

Sven M. Jonsson, Stockholm, Sweden, assignor, by mesne assignments, to The Lubrication Corporation, South Bend, Ind., a corporation of Delaware Continuation of application Serial No. 252,795, February 8, 1928. This application November 30, 1931, Serial No. 577,893. Renewed June 15, 1934

14 Claims. (Cl. 221—47.4)

My invention relates to hand operated grease guns and has for its object to provide a grease gun which is convenient to load, and which will insure clean grease being forced into the bearings in which it is used. This application is a continuation of my copending application, Serial Number 252,795 filed February 8, 1928.

One of the objections found in customary grease guns is the objectionable work of filling the grease into the gun. Also it is found that frequently dust and foreign matter are allowed to get into the grease in the course of transferring it from a can to the gun.

The present invention overcomes these difficulties by providing a gun in which grease may be forced directly from a cartridge or container (in which it may be purchased) into the bearings which are to be lubricated.

I obtain these and other objects by means of the device illustrated in the accompanying drawing in which:

Figure 1 is a longitudinal sectional view of the complete gun together with a nipple into which grease is to be forced.

Figure 2 is a transverse section of the gun.

Figure 3 is a sectional view of an elbow.

Figure 4 is a sectional view of the cartridge used in the gun.

Referring now to Figure 1, the main body of the gun consists of a tubular housing 11 having annular ends 12 and 13 secured therein. A tube 14 is rigidly supported in the end 12, said tube in turn carrying a flange 15 and a plunger 16. A second tube 17 is arranged to slide within the tube 14 and the bore of said tube 17 is made to form a close sliding fit over the plunger 16.

The plunger 16 is tubular and at its inner end is an enlarged chamber 18 to house a ball valve 19 and valve spring 20, said ball and spring forming together a non-return valve adapted to admit lubricant or grease to the cylinder 17 but preventing escape of said lubricant. A second ball valve 21 and spring 22 is provided at the outlet 17' of the tube 17 said valve 21 permitting escape of the lubricant but preventing re-entry to the tube 17.

It will be seen that the parts including the tubular cylinder 17, the plunger 16 and valves 19 and 21, comprise a high pressure pump operated as hereinafter described.

The inner end of the tube 17 is provided with a shoulder 23 which forms an abutment for the spring 24 which normally holds the tubular cylinder 17 in the outward position shown in the drawing.

The end 13 has an opening through which a rod 25 is adapted to slide, said rod is provided at its inner end with a flange 26 and at the outer end of said rod is a handle 27.

The grease or lubricant is held in a detachable cartridge 28, said cartridge being shown complete in Figure 4. The body of the cartridge comprises a cylindrical cup preferably made of metal. At the outer end of said cup is a disc 29, which may be a cork or suitable elastic material, and which is adapted to form a plunger when pressed upon by the flange 15. The plunger 29 has a central hole 30 which permits the lubricant contained in said cartridge to flow from said cartridge into the chamber 18 and thence to the cylinder 17 through the hollow plunger 16.

While used only as a container the cartridge is closed by a tight fitting cover lid 31.

In operation the action is as follows: the handle 27 is pulled outward to make room to insert the cartridge 28. The cartridge is prepared by removing the lid 31 and then inserted in the gun in the position shown in Figure 1.

In using the gun, the end 32 is placed on a suitable nipple 33, and pressure is applied to the handle 27 sufficient to compress the spring 24 and force the plunger 16 into the cylinder 17. It is desirable to fill the tube 17 with grease, at assembly of the parts, and this grease will be forced out through the ball valve 21 and thence to the nipple. When pressure on the handle is relieved sufficiently to allow the spring 24 to return the plunger 16, a partial vacuum will be created in the cylinder 17 tending to draw grease from the cartridge. It will be understood that during this return stroke there will still be considerable pressure on the handle 27 so that the force of the spring 24 will be exerted against the plunger 29, thereby helping to force the grease from the cartridge through the valve 19 into the cylinder 17, said cylinder being thereby charged for the next grease-expelling stroke.

While I have shown the preferred embodiment of my invention, it will be obvious that minor changes in the details of construction may be made without departing from the spirit of my invention or sacrificing any of the advantages of the same.

I claim:

1. In an apparatus of the character described, in combination, a tubular housing carrying a high pressure cylinder and a plunger therefor comprising a grease pump, said pump having an inlet opening and an outlet opening, a removable grease cartridge within said housing, a second plunger within said grease cartridge, means to move said cartridge toward said second plunger, said plunger having an opening adapted to convey grease from said cartridge to the inlet opening of said high pressure pump.

2. In an apparatus of the character described, in combination, a tubular housing carrying a high pressure cylinder and plunger therefor comprising a grease pump, said pump having an inlet opening and outlet opening, said inlet opening having a non-return valve therein, a removable grease cartridge within said housing, a second plunger within said grease cartridge, means to move said cartridge toward said second plunger, said plunger having an opening adapted to convey grease from said cartridge to the inlet opening of said high pressure pump.

3. In an apparatus of the character described, in combination, a tubular housing carrying a high pressure cylinder and a plunger therefor comprising a grease pump, said pump having an inlet opening and an outlet opening, a removable grease cartridge within said housing, said cartridge having substantially non-collapsible side walls a second plunger within said grease cartridge, means to cause said cartridge and said second plunger to move toward each other with the said second plunger telescoping into said cartridge, said second plunger having an opening adapted to convey grease from said cartridge to the inlet opening of said high pressure pump, said means adapted to express the grease from said cartridge into said pump.

4. In an apparatus of the character described, in combination, a frame carrying a high pressure cylinder and plunger therefor, comprising a grease pump, said pump having an inlet and an outlet, a removable grease container within said frame, a second plunger for said container having an opening therethrough, the first named plunger having a flanged abutment adapted to press upon said second plunger to express the grease from said cartridge to said pump, and means to cause relative movement between said container and said second plunger whereby one of said elements will move toward the other element.

5. In a grease dispensing device, a frame, a high pressure pump including a cylinder carried by the frame and adapted to receive a charge of grease, a grease container in said frame having an open end directed toward said cylinder, a plunger in the open end of the container having an opening disposed in registration with the cylinder, a handle, and means whereby a thrust upon said handle in one direction will cause relative movement between said plunger and said container in a direction to move the plunger into the container and to effect operation of said pump.

6. In combination a frame, a grease cartridge therein, said cartridge comprising a cylinder having a closed end and an open end, a plunger comprising an elastic disc adapted to form a grease tight-sliding fit in said cylinder, said plunger having an opening therein, a high pressure pump including a piston and a cylinder communicating with the plunger opening and adapted to receive grease therethrough, and means for imparting a thrust against said cartridge effective to load the high pressure cylinder and to discharge grease from the high pressure cylinder.

7. In a lubricating gun of the push type, a high pressure pump, a cartridge receiver, and an original lubricant package in said receiver, said package comprising a cartridge having a follower in one end and an opening in one end communicating with said pump, said cartridge being disposed in substantially co-axial relation with respect to said receiver and being secured in alignment with said pump, and manually operable means for transmitting axial thrust upon said pump through said cartridge follower, whereby to actuate said pump.

8. A lubricant dispensing device comprising, a high pressure pump including a cylinder, a plunger, and a spring normally urging said plunger out of said cylinder, a low pressure barrel supporting said high pressure pump at one end of the barrel, said barrel and pump being substantially in axial alignment, said plunger being secured at one end relative to said barrel, said barrel being adapted to receive a cartridge of lubricant, means secured relative to said end of said plunger for cooperative engagement with a lubricant cartridge whereby to position said cartridge with respect to the barrel, and a hand operable thrust stem disposed through and supported by the other end of the barrel in substantially axial alignment with the axis of a cartridge disposed in the barrel for engagement with a cartridge to urge lubricant therefrom into said high pressure pump whereby to charge the same.

9. A lubricant dispensing device comprising, a high pressure pump including a cylinder, a plunger operable in said cylinder to force lubricant therefrom and a spring for operating said plunger in one direction, a barrel at one end supporting said high pressure pump in substantially axial alignment, said barrel and plunger being secured against relative movements, a lubricant cartridge, having a discharge opening in one end, disposed in said barrel with its discharge opening toward said high pressure pump, means secured to said plunger for engagement with said discharge end of said cartridge whereby to position the cartridge with respect to the high pressure pump, the last said means also providing an intake opening for the high pressure pump, and a hand operable thrust stem movably disposed through the other end of said barrel for engagement with a part of the cartridge to urge lubricant from the cartridge into said high pressure pump.

10. A lubricant dispensing device comprising, a barrel adapted to receive a removable and replaceable cartridge containing lubricant, a high pressure pump connected to one end of said barrel in axial alignment therewith, said pump including a plunger secured relative to said barrel and a cylinder arranged at one end to telescope over said plunger and arranged at its other end to discharge lubricant, a spring normally tending to urge said cylinder and plunger apart in an axial direction, a lubricant cartridge having an outlet opening at one end disposed in said barrel in axial alignment therewith, and with said outlet opening directed toward said high pressure pump, means connected with said high pressure pump on the interior of said barrel for engagement with the cartridge about the outlet thereof, the last said means providing a passage for lubricant to flow from the cartridge to said high pressure pump, and means including a member passing through the other end of said barrel and coaxial with said barrel for exerting a thrust on a part of said cartridge whereby to load said high pressure cylinder.

11. A lubricant dispensing device comprising, a barrel adapted to receive a removable and replaceable cartridge of lubricant, a cartridge disposed within said barrel in coaxial relation thereto, said cartridge including a cylindrical shell having an axially disposed outlet opening in one end and a follower, a high pressure pump including a cylinder and a telescoping plunger secured to that end of said barrel toward which said cartridge outlet is directed, said pump plunger and cylinder being coaxial with said barrel and cartridge and normally being extended in non-telescoped relationship, and means including a single operating handle for exerting thrust axially of said barrel upon the cartridge relatively to telescope the shell and follower of the cartridge to charge said high pressure cylinder and to discharge said high pressure cylinder.

12. A lubricant dispensing device comprising, a barrel adapted to receive a removable and replaceable cartridge of lubricant, a cartridge disposed within said barrel in coaxial relation thereto, said cartridge including a cylindrical shell having an axially disposed outlet opening in one end and a follower, a high pressure pump including a cylinder and a telescoping plunger secured to that end of said barrel toward which said cartridge outlet is directed, said pump plunger and cylinder being coaxial with said barrel and cartridge and normally being extended in non-telescoped relationship, and means including a single operating handle and a stem secured to said handle and passing through the other end of the barrel in co-axial relationship with said cartridge for exerting thrust axially of said cartridge upon the cartridge follower relatively to telescope the shell and follower to charge said high pressure cylinder and to operate said high pressure pump.

13. In a lubricating hand gun, a high pressure pump including a cylinder, a cartridge receiver, an original lubricant package within said receiver, said package comprising a cartridge having a follower in one end and an opening in one end communicating with said pump cylinder, said cartridge being disposed substantially in co-axial relation with respect to said high pressure pump, and being secured relative thereto, and manually operable means for transmitting thrust along the axis of said pump and against said cartridge follower whereby to charge said cylinder from said cartridge.

14. In a hand lubricating gun, a cartridge receiver, a high pressure lubricant pump carried by said receiver and including a plunger member and a cylinder member, an original lubricant package within said receiver and substantially in co-axial relationship with said pump members, said package comprising a cartridge having a follower at one end and an opening at one end, said opening being adapted for communication with said pump when said cartridge is moved axially in said receiver into engagement with one of said pump members, and manually operable means for transmitting thrust along the axis of said pump and cartridge to said cartridge follower whereby to charge said pump with lubricant from said cartridge and thereafter to cause relative movement between said pump members to operate said pump.

SVEN M. JONSSON.